(12) United States Patent
Spitler et al.

(10) Patent No.: US 7,199,168 B2
(45) Date of Patent: Apr. 3, 2007

(54) PROCESS FOR MAKING CELLULAR COMPOSITES USING POLYMERIC ISOCYANATES AS BINDERS FOR HOLLOW FILLER PARTICLES

(75) Inventors: Kieth G. Spitler, Burgettstown, PA (US); David D. Steppan, Gibsonia, PA (US); Howard S. Duff, Rochester, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 346 days.

(21) Appl. No.: 10/074,752

(22) Filed: Feb. 13, 2002

(65) Prior Publication Data

US 2003/0153635 A1 Aug. 14, 2003

(51) Int. Cl.
*C08J 9/32* (2006.01)

(52) U.S. Cl. ............... 523/218; 264/45.1; 264/241; 521/99; 521/130; 521/163; 521/164; 523/219

(58) Field of Classification Search ............. 523/218, 523/219; 521/130, 99, 163, 164; 264/45.1, 264/241
See application file for complete search history.

(56) References Cited

U.S. PATENT DOCUMENTS

| | | | | |
|---|---|---|---|---|
| 3,965,051 A | * | 6/1976 | Markusch et al. | ........... 521/100 |
| 4,380,474 A | * | 4/1983 | Cioca et al. | .................. 524/11 |
| 4,724,250 A | * | 2/1988 | Schubert et al. | ............. 524/707 |
| 4,785,024 A | | 11/1988 | Sakata et al. | .................. 521/60 |
| 4,843,104 A | | 6/1989 | Melber et al. | ................ 521/54 |
| 4,850,849 A | | 7/1989 | Hsu | ........................... 425/407 |
| 4,902,348 A | * | 2/1990 | Kossatz et al. | ............. 106/780 |
| 4,913,872 A | | 4/1990 | Kiss | ........................... 264/320 |
| 5,271,886 A | | 12/1993 | Collom et al. | ................. 264/50 |
| 5,278,194 A | | 1/1994 | Tickner et al. | ................. 521/55 |
| 5,334,651 A | * | 8/1994 | Schwab et al. | ............. 524/591 |
| 5,389,720 A | * | 2/1995 | Markusch et al. | ........... 524/839 |
| 5,433,905 A | | 7/1995 | Tisch | ........................... 264/83 |
| 5,674,568 A | | 10/1997 | Layton et al. | ............... 427/389.9 |
| 6,166,109 A | * | 12/2000 | Spitler et al. | ................ 523/218 |
| 6,224,800 B1 | * | 5/2001 | Rosthauser | ................ 264/122 |
| 6,235,800 B1 | | 5/2001 | Kyuno et al. | .................. 521/51 |
| 6,235,810 B1 | | 5/2001 | Pavlyuchenko et al. | ..... 523/201 |
| 6,284,809 B1 | * | 9/2001 | Plummer et al. | ............. 521/54 |

FOREIGN PATENT DOCUMENTS

EP 0005903 * 12/1979

* cited by examiner

*Primary Examiner*—John M. Cooney, Jr.
(74) *Attorney, Agent, or Firm*—Joseph C. Gil; N. Denise Brown

(57) ABSTRACT

The present invention relates to a process for the production of a cellular composite, and to the resultant cellular composites. This process comprising (A) preparing a mixture of a polyisocyanate, water, and, optionally, one or more additives; (B) adding this mixture under low shear mixing to inorganic hollow microspheres; (C) completely filling a mold with the mixture; and (D) heating the mold containing the mixture to a temperature of from 100 to 280° C., thereby forming the composite.

8 Claims, No Drawings

PROCESS FOR MAKING CELLULAR COMPOSITES USING POLYMERIC ISOCYANATES AS BINDERS FOR HOLLOW FILLER PARTICLES

BACKGROUND OF THE INVENTION

The present invention relates to a process for the production of a cellular composite, and to the cellular composites produced by this process. This process comprises preparing a mixture of inorganic hollow microspheres, water and a polyisocyanate, filling a mold completely with this mixture, and heating the mold to a temperature of from 100 to 280° C. This causes the polyisocyanate to react with the water and form a polyurea which binds the hollow microspheres, thereby forming a cellular composite.

Polyisocyanates are known to be suitable binders for solid particles of various compositions, e.g. wood flakes, sand, sawdust, etc. They are also known to be used in the production of foams and syntactic foams as a co-reactant for polyurethanes. The use of polyisocyanates as a binder for hollow particles, e.g. hollow microspheres, has not, however, been previously known and/or expected.

U.S. Pat. Nos. 4,785,024, 4,843,104, 5,271,886, 5,278,194, 6,235,800 and 6,235,810 disclose various polymeric microspheres and syntactic foams. However, none of these disclose that a composite can be formed from microspheres and a binder component. U.S. Pat. Nos. 4,850,849, 4,913,872, 5,433,905 and 5,674,568 describe various binders that are suitable to prepare wood composites from wood and wood furnish. These patents do not disclose inorganic microspheres.

Surprisingly, it has now been found that the proper selection of polyisocyanate functionality and viscosity, combined with the use of water as a co-reactant, forms a suitable binder for hollow microspheres that results in the formation of a cellular composite having a high compressive strength and low density at typical (conventional) binder concentrations.

Composites of this type could be used commercially as a low weight core for furniture laminates, or as a building panel in residential or commercial construction. With the addition of optional combustion modifiers, this mostly inorganic composite would offer excellent fire performance in special institutional and aerospace applications. The composition of the hollow microsphere's shell would be chosen, for example, based on the desired fracture strength of the shell and cost.

SUMMARY OF THE INVENTION

This invention relates to a process for the production of a cellular composite and to the resultant cellular composites so produced. This process comprises preparing a reaction mixture, completely filling a mold with the reaction mixture, and heating the filled mold to a temperature of at least 100° C. but not more than 280° C. The reaction mixture comprises inorganic hollow microspheres, water, a polyisocyanate, and, optionally, catalysts, surfactants, combustion modifiers, and other additives that aid the processing or performance for a given application. The heat causes the polyisocyanate to react with the water to form a polyurea which binds the hollow microspheres, thus forming the cellular composite.

DETAILED DESCRIPTION OF THE INVENTION

Suitable polyisocyanates which may be used in the process of the present invention include diisocyanates, adducts of diisocyanates, and preferably liquid polyisocyanates and adducts thereof. Suitable monomeric diisocyanates may be represented by the formula $R(NCO)_2$ in which R represents an organic group having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

Modified polyisocyanates may also be acceptable if their viscosity is sufficiently low to allow the wet-out of the microsphere surface.

In accordance with the present invention, a portion of the polyisocyanate composition may be present in the form of a polyisocyanate adduct. Suitable polyisocyanate adducts are those containing isocyanurate, uretdione, biuret, urethane, allophanate, carbodiimide and/or oxadiazinetrione groups. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879, the disclosures of which are herein incorporated by reference.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749, the disclosures of which are herein incorporated by reference, by using co-reactants such as water, tertiary alcohols, primary and secondary monoamines, and primary and/or secondary diamines.

4) Urethane group-containing polyisocyanates which may be prepared in accordance with the process disclosed in U.S. Pat. No. 3,183,112, the disclosure of which is herein incorporated by reference. These urethane-group containing polyisocyanates can be prepared by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof.

5) Allophanate group-containing polyisocyanates which may be prepared according to the processes disclosed in U.S. Pat. Nos. 3,769,318, 4,160,080 and 4,177,342, the disclosures of which are herein incorporated by reference.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350; the disclosures of which are herein incorporated by reference.

It is more preferred that the polyisocyanates for the presently claimed invention are compositions having a functionality of from about 2.0 to about 3.5, and an NCO group content of about 25% to about 35%, a viscosity of less than about 500 mPa·s at 25° C., and are selected from the group consisting of aromatic polyisocyanates and adducts and mixtures thereof.

It is most preferred that the polyisocyanates have an NCO group content of from 29% to 33% and a functionality of from 2.0 to 3.0. Suitable polyisocyanates satisfying this NCO group content and functionality include, for example, polymethylene poly(phenyl isocyanates) having an NCO group content of from 31% to 33% and a functionality of from 2.3 to 2.9.

Polymeric MDI as used herein, refers to polymethylene poly(phenyl-isocyanate) which in addition to monomeric diisocyanate (i.e., two-ring compounds) contains three-ring and higher ring containing products.

A particularly preferred polyisocyanate comprises a polymethylene poly-(phenylisocyanate) having an NCO content of about 31.5%, a functionality of about 2.8, a viscosity of about 200 mPa·s at 25° C.

Suitable microspheres for the present invention include those which are inorganic hollow microspheres. The inorganic hollow microspheres suitable for the present invention include, for example, microspheres comprised of glass, silicates, boro-silicates, ceramic, or the fly-ash resulting from the combustion of coal and coke. These inorganic hollow microspheres may have a diameter from 1 to 1000 microns, and preferably of between 100 and 250 microns.

In accordance with the present invention, water is present in the reaction mixture used to form the cellular composites. The amount of water is such that there is an excess of from 2 to 5 times the amount of water required (stoichiometrically) based on the NCO group content of the polyisocyanate component. Preferably, the amount of water is such that there is an excess of from 3 to 4 times the amount required based on the NCO group content.

Furthermore, the reaction mixture of the present invention may additionally comprise additives and other auxiliary agents. Some examples of suitable additives and auxiliary agents include catalysts, surfactants, combustion modifiers, and colorants.

Suitable catalysts for the present invention include those known in polyurethane chemistry such as, for example, tertiary amines, metal compounds such as, for example, organotin compounds, Mannich bases of secondary amines (such as dimethylamine) and aldehydes (preferably formaldehyde) or ketones (such as acetone) and phenols, organic metal compounds, especially organic tin, bismuth and zinc compounds, etc.

Suitable surfactants (or surface-active agents) to be used in the presently claimed invention include, for example, emulsifiers and foam stabilizers. Examples of suitable surfactants include any of several silicone surfactants known in the art (including, for example, those available commercially from Witco, Dow Corning Corporation, Union Carbide Chemical and Plastics Co., Inc., and Rhein Chemie Corporation), as well as various alkali metal or ammonium salts of sulfonic acids (e.g., of dodecyl benzene sulfonic acid or of dinaphthyl methane disulfonic acid), amine salts of fatty acids (such as diethylamine oleate or diethanolamine stearate) and sodium salts of ricinoleic acids.

Suitable combustion modifiers (which, as the term is used herein, also include smoke suppressants and other known flame retardants), include, for example, phosphonates, phosphites, and phosphates (such as dimethyl methylphosphonate, ammonium polyphosphate, and various cyclic phosphate and phosphonate esters known in the art); halogen-containing compounds known in the art (such as brominated diphenyl ether and other brominated aromatic compounds); melamine; antimony oxides (such as antimony pentoxide and antimony trioxide); zinc compounds (such as various known zinc borates); aluminum compounds (such as alumina trihydrate); and magnesium compounds (such as magnesium hydroxide).

The process of the present invention comprises preparing a reaction mixture of a polyisocyanate and water; adding this reaction mixture to inorganic hollow microspheres under low shear mixing; filling (completely) a mold with this mixture, and heating the filled mold to a temperature of from 100 to 280° C., preferably 125 to 150° C. It is preferred that the heating continue for from 0.5 to 60 minutes. The application of heat to the mold causes the polyisocyanate and water in the reaction mixture to form a polyurea, which binds the hollow microspheres, thus forming a cellular composite. It is important that the components of the reaction mixture be combined first, even if an emulsion results, so that uniform distribution of the reaction mixture is achieved. A typical process would first combine the reaction mixture of polyisocyanate, water and any optional additives. This mixture is then poured or sprayed onto the desired quantity of hollow microsphers in a low shear tumbler, mixer or blender. The resulting paste-like mixture is transferred to a mold with the desired shape and dimensions, completely filling the mold. The filled mold is then heated until the binder is cured. Uncatalyzed binder mixtures may take as long as 60 minutes to cure, but the absence of catalyst increases the thermal stability of the composite. Catalyzed binder mixtures will have shortened cure times, and would be acceptable for room or low temperature applications.

The cellular composites of the present invention exhibit high compressive strength at low density, when using conventional binder concentrations relative to the quantity of material to be bound (i.e. the microspheres). The composites produced by this process are suitable for commercial use as low weight cores for furniture laminates, or as building panels in residential or commercial construction. With the addition of optional combustion modifiers, this mostly inorganic composite would offer excellent fire performance in special institutional and aerospace applications. The composition of the filler would be chosen, for example, based on the desired fracture strength of the hollow microsphere shell and cost. Further, the composition of the reaction mixture would be determined by cycle time requirements and end-use environment, such as temperature.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all formulation compositions are in parts by weight (PBW).

EXAMPLES

| | |
|---|---|
| Polyisocyanate A: | a polymethylene poly(phenyl isocyanate) having an NCO group content of 31.5% by weight, a functionality of 2.8, a viscosity of 200 mPa · s at 25° C. |
| Polyisocyanate B: | a carbodiimide modified methylene-bis-phenylenediisocyanate having an NCO group content of 2.5% by weight, a functionality of 2.1, and a viscosity of 80 mPa · s at 25° C. |
| Microspheres: | hollow ceramic microspheres having a diameter of 120–130 microns, commercially available as Extendospheres SG from The PQ Corporation. |

The following process was used to produce the cellular composites in Examples 1–8 below. A mixture of the water and polyisocyanate, at a 3.5 times stoichiometric excess of water was prepared at room temperature using a simple air driven stirrer with a paddle mixing blade. This mixture was poured into the specified quantity of hollow microspheres which were under modest agitation in a low shear mixer. The resulting paste-like mixture was poured into a circular mold, 0.5 inches thick and 4 inches in diameter, with the quantity of the mixture being sufficient to completely fill the mold. The filled mold was then heated to a temperature of 125° C. for 60 minutes in a Carver heated platten hydraulic press. This resulted in the polyisocyanate and water forming a polyurea which binds the hollow microspheres, thus forming a cellular composite.

The resultant cellular composites from each example were tested for Compression Strength at Yield using COM 695, and Density using ASTM D 1622.

| Chemical Composition (PBW) | Example 1 | Example 2 | Example 3 | Example 4 |
|---|---|---|---|---|
| Water | 2.5 | 3.75 | 5 | 6.25 |
| Polyisocyanate A | 10 | 15 | 20 | 25 |
| Microspheres | 50 | 50 | 50 | 50 |
| Test Details | | | | |
| Compression Strength at Yield (psi) | 1015 | 1815 | 2090 | 2589 |
| Density (Lb/Ft$^3$) | 32.0 | 34.4 | 36.8 | 39.9 |

TABLE 2

| Chemical Composition (PBW) | Example 5 | Example 6 | Example 7 | Example 8 |
|---|---|---|---|---|
| Water | 2.5 | 3.75 | 5 | 6.25 |
| Polyisocyanate B | 10 | 15 | 20 | 25 |
| Microspheres | 50 | 50 | 50 | 50 |
| Test Details | | | | |
| Compression Strength at Yield (psi) | 398 | 757 | 562 | 660 |
| Density (Lb/Ft$^3$) | 32.1 | 35.1 | 37.3 | 37.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a cellular composite consisting of:
   (A) preparing a mixture consisting of (1) a polyisocyanate and (2) water, wherein said water is present in an amount such that there is an excess of from 2 to 5 times the stoichiometric quantity required based on the NCO group content of said polyisocyanate;
   (B) adding the mixture formed in (A) to (3) an inorganic component consisting of inorganic hollow microspheres under low shear mixing, in which the amount of mixture formed in (A) is from 20 to 38.5% by weight and the amount of hollow microspheres is from 61.5 to 80% by weight, with the sum of the %'s by weight totaling 100% by weight of the cellular composite;
   (C) completely filling a mold with the mixture formed in (B); and
   (D) heating the filled mold at a temperature of from 100 to 280° C.; thereby reacting the polyisocyanate and water to form a polyurea which binds the hollow microspheres, thus forming a cellular composite.

2. The process of claim 1, wherein (D) said heating is at a temperature of from 125 to 150° C.

3. The process of claim 1, wherein (B)(3) said inorganic hollow microspheres are selected from the group consisting of glass, silicates, boro-silicates, ceramic, fly-ash and mixtures thereof.

4. The process of claim 1, wherein (A)(1) said polyisocyanate is characterized by an NOD group content of from 25 to 35% by weight, and a functionality of from 2.0 to 3.5, a viscosity of less than about 500 mPa·s at 25° C., and is selected from the group consisting of aromatic polyisocyanates, and adducts and mixtures thereof.

5. The process of claim 1, wherein (A)(2) said water is present in an amount such that there is an excess of from 3 to 4 times the stoichiometric quantity required based on the NOD group content of (A)(1) said polyisocyanate.

6. The process of claim 1, wherein (D) said heating continues from 0.5 to 60 minutes.

7. A cellular composite produced by the process of claim 1.

8. The process of claim 1, wherein (A)(1) said polyisocyanate consists of a polymethylene poly(phenylisocyanate) and is characterized by an NCO group content of 29 to 33% by weight, and a functionality of from 2.0 to 30.

* * * * *

UNITED STATES PATENT AND TRADEMARK OFFICE
CERTIFICATE OF CORRECTION

PATENT NO. : 7,199,168 B2
APPLICATION NO. : 10/074752
DATED : April 3, 2007
INVENTOR(S) : Kieth G. Spitler et al.

It is certified that error appears in the above-identified patent and that said Letters Patent is hereby corrected as shown below:

In Col. 2, line 18, replace "dilsocyanates" with --diisocyanates--.

In Claim 4, at col. 6, line 49, replace "NOD" with --NCO--.

In Claim 5, at col. 6, line 57, replace "NOD" with --NCO--.

Signed and Sealed this

Twenty-third Day of September, 2008

JON W. DUDAS
*Director of the United States Patent and Trademark Office*